United States Patent
Campbell et al.

(10) Patent No.: US 11,650,926 B2
(45) Date of Patent: *May 16, 2023

(54) VIRTUAL CACHE SYNONYM DETECTION USING ALIAS TAGS

(71) Applicant: International Business Machines Corporation, Armonk, NY (US)

(72) Inventors: David Campbell, Austin, TX (US); Bryan Lloyd, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/370,229

(22) Filed: Jul. 8, 2021

(65) Prior Publication Data

US 2021/0334214 A1    Oct. 28, 2021

Related U.S. Application Data

(63) Continuation of application No. 16/267,882, filed on Feb. 5, 2019, now Pat. No. 11,086,787.

(51) Int. Cl.
*G06F 12/0877* (2016.01)

(52) U.S. Cl.
CPC .... *G06F 12/0877* (2013.01); *G06F 2212/151* (2013.01); *G06F 2212/657* (2013.01)

(58) Field of Classification Search
CPC ............ G06F 12/0877; G06F 12/0842; G06F 12/1475; G06F 12/1036; G06F 12/109; G06F 12/1063; G06F 12/1032; G06F 2212/151; G06F 2212/657; G06F 2212/1032; G06F 2212/1052; G06F 2212/1016; G06F 2212/655

See application file for complete search history.

(56) References Cited

U.S. PATENT DOCUMENTS

| | | |
|---|---|---|
| 9,772,943 B1 | 9/2017 | Mukherjee |
| 2007/0250666 A1 | 10/2007 | Sartorius et al. |
| 2018/0095765 A1 | 4/2018 | Mekkat et al. |
| 2018/0203702 A1 | 7/2018 | Yu et al. |

OTHER PUBLICATIONS

Yoon H. et al., "Filtering Translation Bandwidth with Virtual Caching," ASPLOS '18: Architechtural Support for programming Languages and Operating Systems, Mar. 24-28, 2018.
List of IBM Patents or Patent Applications Treated as Related, dated Jul. 8, 2021, 2 pages.

*Primary Examiner* — Kalpit Parikh
(74) *Attorney, Agent, or Firm* — Scully, Scott, Murphy & Presser, P.C.

(57) ABSTRACT

A system and method of handling data access demands in a processor virtual cache that includes: determining if a virtual cache data access demand missed because of a difference in the context tag of the data access demand and a corresponding entry in the virtual cache with the same virtual address as the data access demand; in response to the virtual cache missing, determining whether the alias tag valid bit is set in the corresponding entry of the virtual cache; in response to the alias tag valid bit not being set, determining whether the virtual cache data access demand is a synonym of the corresponding entry in the virtual cache; and in response to the virtual access demand being a synonym of the corresponding entry in the virtual cache with the same virtual address but a different context tag, updating information in a tagged entry in an alias table.

20 Claims, 9 Drawing Sheets

VIRTUAL CACHE SYNONYM DETECTION USING ALIAS TAGS

BACKGROUND

The disclosure herein relates generally to information handling and/or data processing systems, and more particularly, to methods, apparatuses, and systems for handling and tagging data in virtual caches in a computer system, including synonyms in the virtual cache.

Modern information and data handling systems often include processors that include a set of data processing circuitry or hardware units. The circuitry and hardware units are typically connected in series and include a number of stages. For example, an "instruction fetch" stage where an instruction is fetched from memory and a "decode" stage, where the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. An instruction in the issue queue (ISQ) typically is issued to an execution unit in an "execution" stage where the operation as specified by the instruction is executed. Executing an operation specified by an instruction typically includes accepting data, e.g., one or more operands, and producing one or more results. There are usually registers, caches, and queues to hold data, information and/or instructions for the hardware units.

Among other tasks, memory management manages the data stored in a computer including overseeing the retrieval and storage of data from memory in a computer. Computer systems often include physical memory used to store applications and data. Modern computers typically rely on a memory management technique known as virtual memory management to increase performance and provide greater flexibility in computers and the underlying architectural designs upon which they are premised. Virtual memory management systems can include a hypervisor or virtual machine monitor (VVM), which is computer software, firmware, or hardware that creates and runs multiple virtual machines as guests on a computer where computing resources such as memory and processing capability are shared. In a system with virtual memory, the processor typically issues and uses virtual memory addresses. Computer programs that execute on the computer access the memory system using addresses pointing to locations in the virtual memory space. In virtualized systems, virtual caches are used where the virtual cache directory is tagged with the virtualized address instead of the physical address. The physical memory devices in the computer, however, are accessed via "real" addresses that map directly into specific memory locations in physical memory devices. Hardware and/or software in the computer are provided to perform "address translation" to map the real memory addresses of the physical memory to virtualized addresses in the virtual memory space.

SUMMARY

The summary of the disclosure is given to aid understanding of a computer system, computer architectural structure, processor, virtual caches, and their method of operation, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, virtual caches and their method of operation to achieve different effects.

In one or more embodiments, a method of handling data access demands in a virtual cache by a processing system is disclosed. The method in an embodiment includes: making a data access demand to a virtual cache having a plurality of entries; in response to the data access demand missing in the virtual cache, determining if the virtual cache data access demand missed because of a difference in the context tag of the data access demand and the context tag of a corresponding entry in the virtual cache with the same virtual address as the data access demand; in response to the virtual cache missing because of a difference in the context tag of the data access demand and the corresponding entry in the virtual cache, determining whether the alias tag valid bit is set in the corresponding entry of the virtual cache; in response to the alias tag valid bit not being set for the corresponding entry in the virtual cache with the matching virtual address of the data access demand but a different context tag, determining whether the virtual cache data access demand hits in physical memory with the translated real address and is a synonym of the corresponding entry in the virtual cache; and in response to the virtual access demand being a synonym of the corresponding entry in the virtual cache with the same virtual address but a different context tag, updating information in a tagged entry in an alias table referenced by the corresponding entry in the virtual cache.

The method in an aspect includes updating information in the tagged entry in the alias table includes adding the virtual address of the virtual cache access demand and the translated real address of the synonym. In one or more embodiments, the method further includes adding the thread identification to the tagged entry in the alias table, wherein the thread identification identifies the thread making the virtual cache access demand. The method, in an aspect, in response to the alias tag valid bit being set for the corresponding entry in the virtual cache with the matching virtual address of the access demand but a different context tag, further includes determining if the thread making the data access demand to the virtual cache has permission to access the corresponding entry in the virtual cache. The method preferably includes checking the tagged entry in the alias table referenced by an alias tag bit field in the corresponding entry in the virtual cache to determine if the thread making the data access demand to the virtual cache has permission to access that corresponding entry in the virtual cache.

A computing system is disclosed according to one or more embodiments that includes a virtual cache having a plurality of entries having a virtual address and associated data, each entry in virtual cache having a bit field for a context tag, the virtual address, an alias tag valid, and an alias tag; physical memory having a plurality of entries for storing data; an alias table for tracking the virtual address and translated real address of synonyms; and a processor; wherein the system is configured to: make a data access demand to the virtual cache; in response to the data access demand missing in the virtual cache, determining if the virtual cache data access demand missed because of a difference in the context tag of the data access demand and the context tag of a corresponding entry in the virtual cache with the same virtual address as the data access demand; in response to the virtual cache missing because of a difference in the context tag of the data access demand and the corresponding entry in the virtual cache, determine whether the alias tag valid bit is set in the corresponding entry of the virtual cache; in response to the alias tag valid bit not being set for the corresponding entry in the virtual cache with the matching virtual address of the data access demand but a different context tag, determine whether the virtual cache data access demand hits in physical memory with the translated real address and is a synonym of the corresponding entry in the virtual cache; and in response to the virtual access demand being a synonym of the corresponding entry in the virtual cache with the same virtual address but a different context tag, update information in a tagged entry in the alias table referenced by the corresponding entry in the virtual cache. In one or more aspects, the system is further configured to check the tagged entry in the alias table referenced by an alias tag bit field in the corresponding entry in the virtual cache to determine if the thread making the data access demand to the virtual cache has permission to access that corresponding entry in the virtual cache. In a further embodiment, in response to the virtual access demand being a synonym of the corresponding entry in the virtual cache with the same virtual address but a different context tag, update the tagged entry in the alias table to grant permission to the thread of the data access demand.

A computing system in one or more embodiments is disclosed having: a virtual cache having a plurality of entries having a virtual address and associated data, wherein each entry has a bit field for a context tag, the virtual address, an alias tag valid, and an alias tag; a physical memory having a plurality of entries for storing data; an alias table for tracking the virtual address and translated real address of synonyms, the alias table having a plurality of entries, each entry including the virtual address and mapped real address of a synonym, and a tread identification; a processor; and a non-transitory computer-readable storage medium comprising program instructions that when executed by the processor cause the processor to: make a data access demand to the virtual cache; in response to the data access demand missing in the virtual cache, determine if the virtual cache data access demand missed because of a difference in the context tag of the data access demand and the context tag of a corresponding entry in the virtual cache with the same virtual address as the data access demand; in response to the virtual cache missing because of a difference in the context tag of the data access demand and the corresponding entry in the virtual cache, determine if the alias tag valid bit is set in the corresponding entry of the virtual cache; in response to the alias tag valid bit not being set for the corresponding entry in the virtual cache with the matching virtual address of the access demand but a different context tag, determining whether the virtual cache data access demand hits in physical memory with the translated real address and is a synonym of the corresponding entry in the virtual cache; and in response to the virtual access demand being a synonym of the corresponding entry in the virtual cache with the same virtual address but a different context tag, updating information in a tagged entry in the alias table referenced by the corresponding entry in the virtual cache.

The foregoing and other objects, features and advantages of the invention will be apparent from the following more particular descriptions of illustrative embodiments of the invention as illustrated in the accompanying drawings wherein like reference numbers generally represent like parts of illustrative embodiments of the invention.

BRIEF DESCRIPTION OF THE DRAWINGS

The various aspects, features and embodiments of a computer system, computer architectural structure, processor, virtual caches, and their method of operation will be better understood when read in conjunction with the figures provided. Embodiments are provided in the figures for the purpose of illustrating aspects, features, and/or various embodiments of the computer system, computer architectural structure, processors, virtual caches, and their method of operation, but the claims should not be limited to the precise arrangement, structures, features, aspects, assemblies, subassemblies, systems, circuitry, embodiments, methods, processes, techniques, and/or devices shown, and the arrangements, structures, systems, assemblies, subassemblies, features, aspects, methods, processes, techniques, circuitry, embodiments, and devices shown may be used singularly or in combination with other arrangements, structures, assemblies, subassemblies, systems, features, aspects, circuitry, embodiments, methods, techniques, processes, and/or devices.

DETAILED DESCRIPTION

Figure 1:
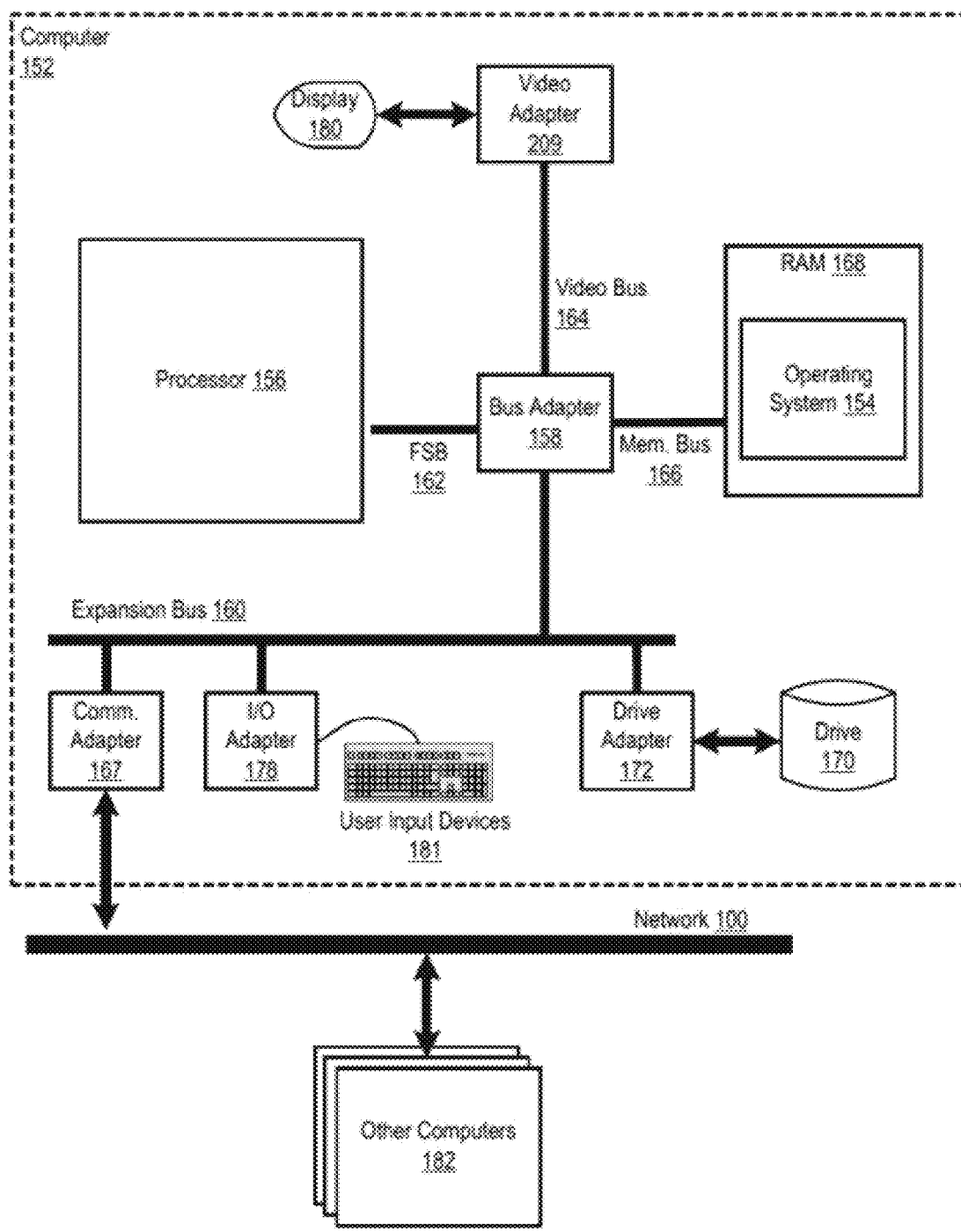
FIG. 1 is a functional block diagram illustrating a computer system, according to embodiments of the present disclosure.

The following description is made for illustrating the general principles of the invention and is not meant to limit the inventive concepts claimed herein. In the following detailed description, numerous details are set forth in order to provide an understanding of the computer system, computer architectural structure, processor, virtual caches, and their method of operation, however, it will be understood by those skilled in the art that different and numerous embodiments of the computer system, computer architectural structure, processor, virtual caches, and their method of operation may be practiced without those specific details, and the claims and disclosure should not be limited to the arrangements, structures, systems, assemblies, subassemblies, circuitry, features, aspects, processes, methods, techniques, embodiments, and/or details specifically described and shown herein. Further, particular features, aspects, arrangements, systems, embodiments, techniques, etc. described herein can be used in combination with other described features, aspects, arrangements, systems, embodiments, techniques, etc. in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification and claims, specify the presence of stated features, integers, aspects, arrangements, embodiments, structures, systems, assemblies, subassemblies, steps, operations, elements, and/or components, but do not preclude the presence or addition of one or more other features, integers, aspects, arrangements, embodiments, structures, systems, assemblies, subassemblies, steps, operations, elements, components, and/or groups thereof.

The following discussion omits or only briefly describes conventional features of information processing systems, including processors and microprocessor systems and architectures, as well as virtual caches and systems, which should be apparent to those skilled in the art. It is assumed that those skilled in the art are familiar with the general architecture of processors, and in particular with virtual caches and systems, and their operation. It may be noted that a numbered element is numbered according to the figure in which the element is introduced, and is typically referred to by that number throughout succeeding figures.

Modern computer systems including systems using virtualized memory management can include a hypervisor or virtual machine monitor (VVM), which is computer software, firmware, or hardware that creates and runs multiple virtual machines as guests on a computer where computing resources such as memory and processing capability are shared. In virtualized systems, the system uses virtual caches in the microprocessor where the virtual cache directory is tagged with the virtualized address instead of the physical address. Virtual caches that utilize virtual addresses as opposed to physical addresses are used in non-virtualized systems as well. Computer programs that execute on the computer typically access the memory system using addresses pointing to locations in the virtual memory space. The physical memory devices in the computer, however, are accessed via "real" addresses that map directly into specific memory locations in physical memory devices. Hardware and/or software are provided to perform address translation to map the real memory addresses of the physical memory to virtualized addresses in the virtual memory space. As such, in one or more embodiments, when a computer program on a computer attempts to access memory using a virtualized address, the computer translates the virtualized address into a corresponding real address so that access can be made to the appropriate location in the appropriate physical device mapped to the virtualized address.

When dealing with operating system address translation or virtual memory, the operating system will setup various translations for different processes such that the virtual address of process A and process B will map to the same real physical address of the machine. In practice, this is used for shared libraries of code regions of memory, as well as memory-mapped files. Two different virtual addresses mapping to the same physical or real address are referred to as synonyms or aliases. The same virtual addresses mapping to the same real address, but having a different process identifier (context tag), are also synonyms as the same virtual address with a different context tag are considered "different virtual addresses." In one or more embodiment, to correctly maintain local store tracking in an out-of-order processor, a single physically accessible cache line can exist in only one location of a virtual cache. As such, synonyms, e.g., different virtual addresses mapping to the same real address, in one or more embodiments can not exist in the virtual cache together and will thrash the virtual cache. Two different operating system processes having the same virtual address and real address to refer to the data being accessed by an executing program, use different process identifiers to distinguish the logical address space of process A and process B. That is, the virtual cache in the micro-processor is tagged such that the two logical address spaces are tagged with different process identifiers. Since the nature of process A's translation and process B's translation are unknown, two processes having the same virtual address mapping to the same real address are tagged with an address space or process identifier in the virtual cache directory. This address space identifier or encoding is referred to as a "context tag".

Since process A and process B have two separate logical address spaces, they will have two separate context tags that will distinguish them in the virtual cache directory. This means that process A and process B can no longer concurrently access the shared data in the virtual cache because they have mismatching context tags. If, however, the data existed in a physical cache, tagged with the physical address, process A and process B could concurrently access the data in the cache and concurrently hit in the cache. Accordingly, where two processes are to share data, and in virtual caches where a single physical accessible cache line can exist in only one location of a virtual cache, the virtual cache design is subject to performance loss compared to the physical cache hitting and the virtual cache missing.

The two processes however are close to sharing their data, e.g., hitting, in the virtual cache. They have the same effective address so without the different context tag, the two processes would hit in the virtual cache. The context tag, however, is needed to tag the virtual cache because although a region of the memory may have the same virtual address mapping to the same physical address, this mapping does not hold true over the entire address space, and in fact, the two processes can have the same virtual address mapping to different physical addresses, otherwise referred to as homonyms. There are regions of address space that are detectable where the property of "same virtual address, same physical address, different context tag," would hit in a physical cache and where data is intended to be shared between the processes.

Disclosed are virtual cache synonym detection techniques and systems to enable a plurality of operating system processes to share data in a virtual memory cache where the different processes have the same virtual and real address, but have a different context tag. In one or more embodiments, where multiple different processes have the same virtual and real address, but a different context tag, an alias tag is assigned to a region of memory in the computer system wherein multiple processes that have access to the alias tag are allowed to concurrently hit in the virtual memory cache. In one or more embodiments, an alias tag is used in the virtual cache directory in addition to the virtual address and context tag that will allow two different processes to hit in the cache concurrently if they have the "same virtual address, same physical address, but a different context tag." An algorithm in an embodiment will identify a valid region of memory where two processes should share data and have the same virtual address, same real address, but are tracked by different context tags, and assign that region of memory an alias tag. When the two different processes access the virtual cache for cache lines (entries) that are being tracked by the algorithm, although they have different context tags, the algorithm will assign them the same alias tag. If, for example, the cache lines (entries) in the virtual cache accessed by process A and process B have the same alias tag X in the tag store of the virtual cache, and process A and process B both have access to alias tag X, then the two process are allowed to concurrently hit in the virtual cache. The alias tag acts to override the differing context tags and allows the virtual cache to hit if the processes have access to the same alias tags.

Virtual caches and virtual cache accesses typically occur in a data or information handling environment, and more specifically commonly in a processor based system and/or a computerized environment. FIG. 1 is a functional block diagram illustrating a computer system 150 in which embodiments of the disclosure may be practiced. The system 150 includes an example of automated computing machinery in the form of a computer 152.

The computer 152 may include at least one processor 156 or central processing unit ("CPU") as well as random access memory 168 ("RAM"), which is connected via a high speed memory bus 166 and bus adapter 158 to the processor 156 and to other components of the computer 152.

Although the processor 156 is shown to be coupled to RAM 168 through the front side bus 162, the bus adapter 158, and the high speed memory bus 166, those of ordinary skill in the art will recognize that such configuration is only an exemplary implementation and other configurations of coupling the processor 156 to other components of the system 150 may be utilized. For example, in some embodiments the processor 156 may include a memory controller configured for direct coupling to the memory bus 166. Yet, in other embodiments, the processor 156 may support direct peripheral connections, such as Peripheral Component Interconnect express ("PCIe") connections and the like.

An operating system 154 may be stored in RAM 168 of the computer 152. Operating systems, useful in computers configured for operation of a processor, may include UNIX™, Linux™, Microsoft Windows™, AIX™, IBM's z/OS™, and others known to those of ordinary skill in the art. In addition to the operating system 154 being located in RAM 168, other components of such as data processing applications may be stored in the RAM 168. Furthermore, software and other components may be stored in non-volatile memory, such as on a disk drive 170.

The computer 152 may include a disk drive adapter 172 coupled through an expansion bus 160 and bus adapter 158 to the processor 156 and other components of the computer 152. The disk drive adapter 172 may connect non-volatile data storage to the computer 152 in the form of the disk drive 170. The disk drive adapter may include Integrated Drive Electronics ('IDE') adapters, Small Computer System Interface ('SCSI') adapters, and others known to those of ordinary skill in the art. Non-volatile computer memory may also be implemented as an optical disk drive, electrically erasable programmable read-only memory (so-called 'EEPROM' or 'Flash' memory), RAM drives, and others known to those of ordinary skill in the art.

The computer 152 may include one or more input/output ("I/O") adapters 178. I/O adapters 178 may implement user-oriented input/output through, for example, software drivers and computer hardware for controlling output to display devices, such as computer display screens, as well as user input from user input devices 181, such as a keyboard and mouse. The computer 152 may include a video adapter 209, which is an example of an I/O adapter specially designed for graphic output to a display device 180, such as a display screen or computer monitor. Video adapter 209 is connected to the processor 156 through the high speed video bus 164, bus adapter 158, and the front side bus 162, which may also be a high speed bus. I/O adapters 178 may also include COMM and Drive adapters. I/O adapters 178 may also be a PCI Express in which all I/Os are connected.

The computer 152 may include a communications adapter 167 for data communications with other computers 182 and for data communications with a data communications network 100. Such data communications may be carried out serially through RS-232 connections, through external buses such as a Universal Serial Bus ("USB"), through data communications networks such as IP data communications networks, and in other ways known to those of ordinary skill in the art. Communications adapter 167 may implement the hardware level of data communications through which one computer sends data communications to another computer, directly or through the data communications network 174. Examples of the communications adapter 167 may include modems for wired dial-up communications, Ethernet (IEEE 802.3) adapters for wired data communications, and 802.11 adapters for wireless data communications.

The arrangement of computers and other devices illustrated in FIG. 1 are for explanation, not for limitation. Data processing systems useful according to various embodiments of the present disclosure may include additional servers, routers, other devices, and peer-to-peer architectures. Networks in such data processing systems may support many data communications protocols, including, for example, TCP (Transmission Control Protocol), IP (Internet Protocol), HTTP (HyperText Transfer Protocol), WAP (Wireless Access Protocol), HDTP (Handheld Device Transport Protocol), and others known to those of ordinary skill in the art. Various embodiments of the present disclosure may be implemented on a variety of hardware platforms, in addition to those illustrated in FIG. 1.

Figure 2A:
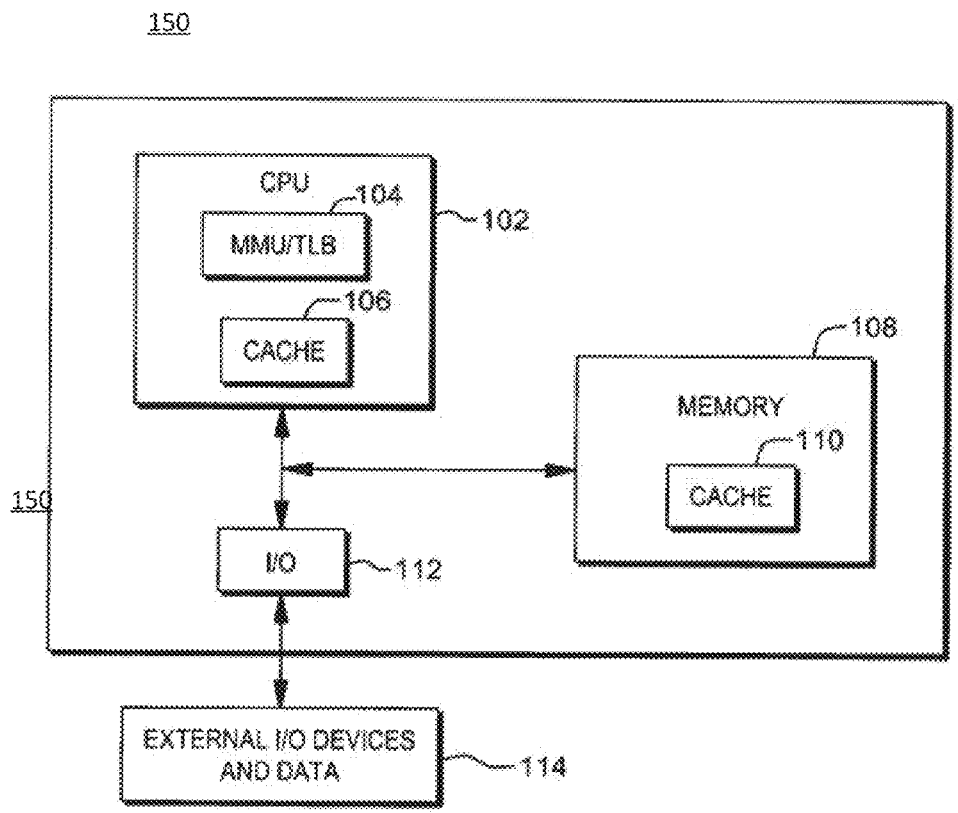
FIG. 2A depicts an example of a computing environment.

One example of a computing environment to incorporate and use one or more virtual caches and virtual cache access techniques is described with reference to FIG. 2A. In one example, a computing environment 150 includes a processor (central processing unit—CPU) 102 that includes at least a cache 106 and at least one memory management unit (MMU) having a translation look-aside buffer (TLB), referred to as MMU/TLB portion 104. Processor 102 is communicatively coupled to a memory portion 108 having a cache 110, and to an input/output (I/O) portion 112. I/O portion 112 is communicatively coupled to external I/O devices 114 that may include, for example, data input devices, sensors and/or output devices, such as displays.

Memory management unit 104 is used in managing memory portion 108 including facilitating access to the memory by providing address translation. Cache 106 may be a virtual cache having a virtual cache directory tagged with virtual addresses instead of real or physical addresses. In an embodiment, to improve address translation, the memory management unit (MMU) 104 can utilize a translation buffer, more specifically a translation look-aside buffer (TLB). The translation buffer or TLB is a cache of previously translated addresses. Thus, when a request is received for a memory access that includes an address to be translated, typically the translation buffer or TLB is checked first. If the address is cached in the translation buffer or TLB, then the address is provided to the processor. Otherwise, the received address is translated using one of any number of translation techniques.

Figure 2C:
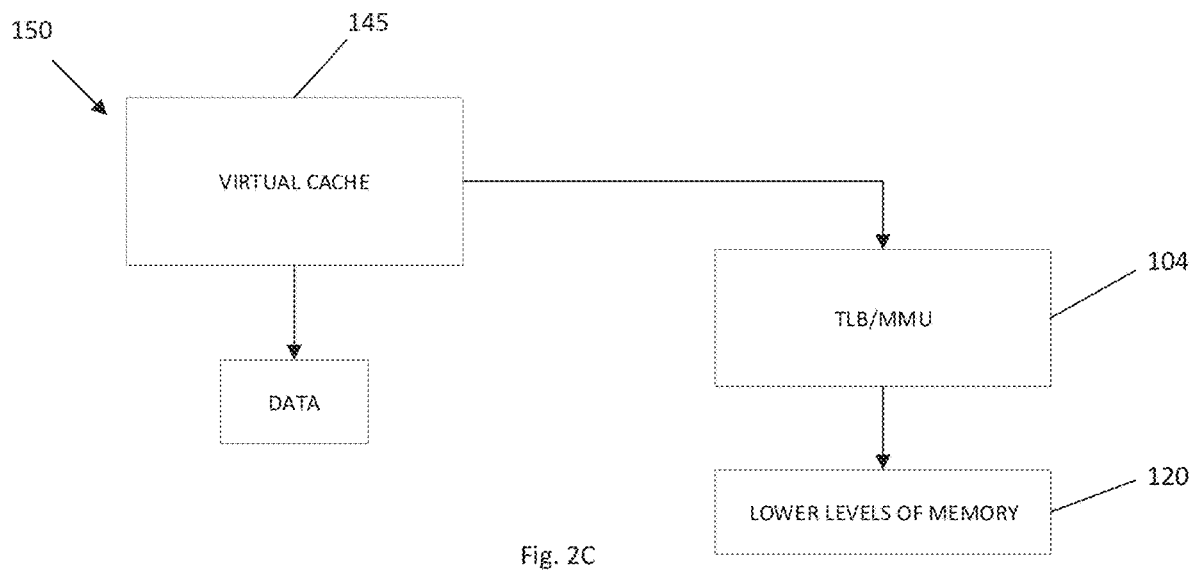
FIG. 2C depicts an example of a virtual cache in a computing environment.
Figure 2B:
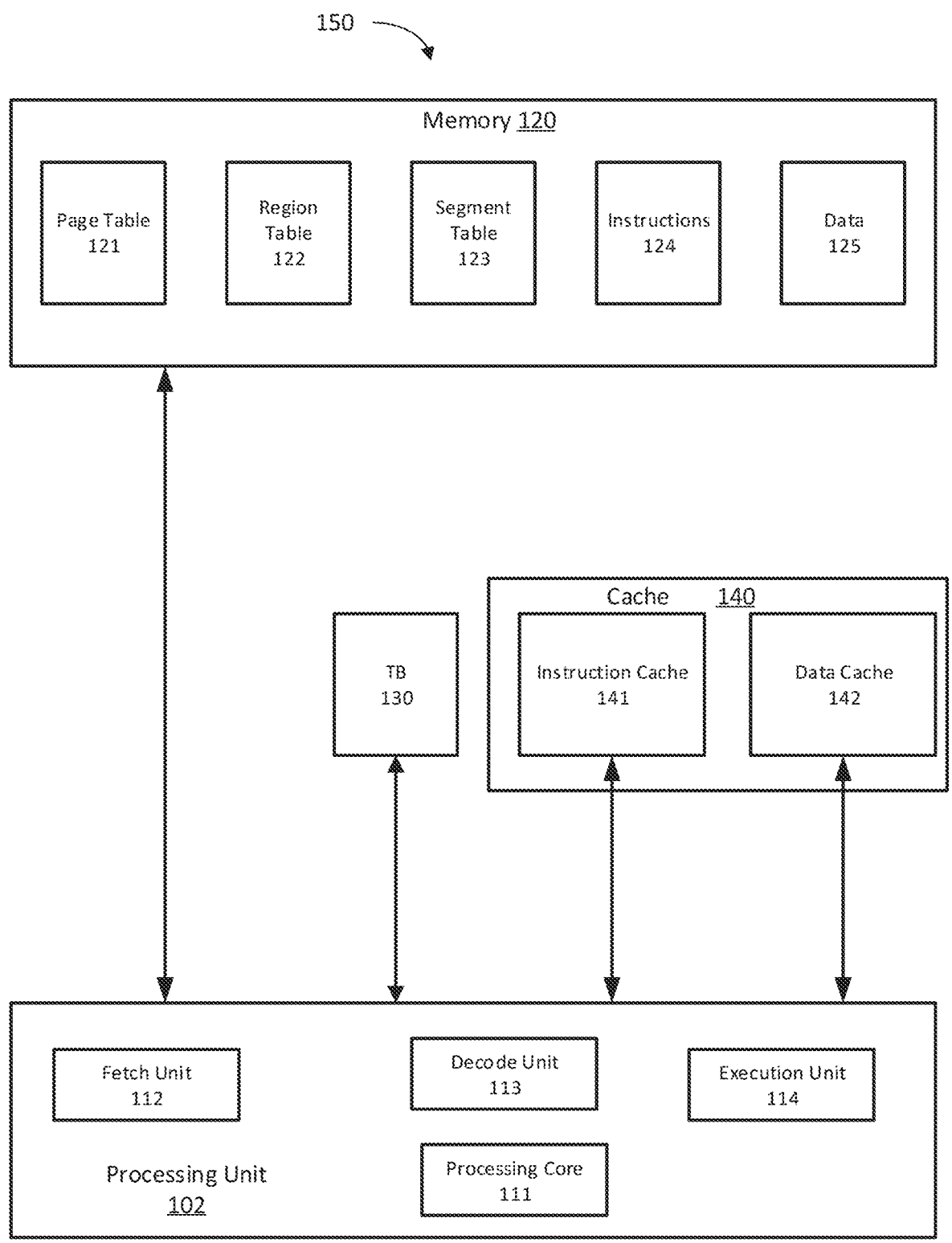
FIG. 2B depicts another example of a computing environment.

FIG. 2B illustrates a block diagram of an embodiment of a processing system 150. The processing system 150 includes a processing unit 102, memory 120, a translation buffer 130, and cache memory 140. Cache memory 140 includes instruction cache 141 and the data cache 142, which store instructions and data, respectively, for quick access by the processing unit 102 during execution of instructions. Cache memory 140 in an embodiment includes virtual data caches 142.

The processing unit 102 receives data, such as operand data and instructions, and executes the instructions. The processing unit 102 may include, for example, a processing core 111 including logic and other circuitry for processing data and instructions, a fetch unit 112 configured to fetch instructions, a decode unit 113 configured to decode instructions, and an execution unit 114 configured to execute the instructions. Although a few functional units of the processing unit 102 are illustrated for purposes of description, it is understood that the processing unit 102 may include additional functional units for retrieving, processing, and storing instructions and data.

Processing system 150 further includes memory 120 configured to store instructions 124 and data 125 which may be accessed and manipulated by the instructions 124. The memory 120 can include volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cassette or the like, etc.). Moreover, the memory 120 may incorporate electronic, magnetic, optical, and/or other types of storage media. In some embodiments, the memory 120 may have a distributed architecture, where various components are situated remote from one another, but can be accessed by the processing unit 102. In this disclosure, the terms physical memory, real memory, system memory and absolute memory are used interchangeably to refer to the main storage accessible to a physical processor.

Address translation in a virtual memory system typically incorporates accessing various address translation data structures. Memory 120 includes dynamic address translation structures, such as a page table 121, region table 122, and segment table 123. Page table 121 includes multiple entries that map virtual addresses to real addresses on a page-by-page basis. Likewise, for handling segmentation, segment table 123 includes entries that map effective addresses to virtual addresses on a segment-by-segment basis.

Page table 121 maps addresses on a page-by-page basis and includes one or more page table entries (PTEs). Translation buffer (TB) 130 is a data structure used for storing some of the address mappings by caching entries (PTEs) from page table 121 located in memory 120. In the embodiment of FIG. 2B, TB 130 stores mappings from virtual memory addresses (VA) to physical memory or real addresses (RA). The TB in FIG. 2B may include virtual addresses, real addresses corresponding to the virtual addresses, and additional information that categorizes or defines one or more of the virtual addresses and the real addresses or provides information to a processing unit about the real address or the virtual address.

In the embodiment of FIG. 2B, in operation, the fetch unit 112 fetches an instruction from memory 120 or from the instruction cache 141. The decode unit 113 reads the instruction and in one or more embodiments determines or identifies one or more virtualized addresses referenced by the instruction. The processor may access virtual data cache 142, to access data referred to by the virtualized address. Virtual caches are used where the virtual cache directory is tagged with the virtualized address instead of the physical address. A virtual cache will compare the virtual address of a data access down to the cache line. If the virtual address/tag is in the virtual cache directory, then the virtual cache hits and the data is read/written.

If the access demand misses in the virtual cache, then the data access demand is sent to memory 120 to retrieve the data into the virtual cache 142. When the data access demand is sent to memory 120, typically the virtual address needs to be translated to a real or physical address. The data corresponding to the data access is retrieved from memory 120 and reloaded into the cache 140, in this example into data virtual cache 142, and the virtual cache directory is updated.

FIG. 2C illustrates a block diagram of another embodiment of a processing system 150. The processing system 150 includes a processing unit 102 (not shown), memory 120, a translation look-aside buffer (TLB/MMU) 104, and virtual cache memory 145. Accesses to virtual cache 145 are made using virtual addresses and if the virtual cache hits, e.g., there is a match in the virtual cache 145, then the referenced (mapped) data is supplied. If there is a miss in the virtual cache, the virtual address is sent to the TLB/MMU 104 for translation to a real address (RA), and the access is sent to memory 120 to retrieve the data.

Virtual addresses are often partitioned for the purposes of address translation into offset bits and effective address bits, with the offset bits pointing to a specific address in a page. Translation buffer (TB) entries generally only map a certain number of bits from a virtual address to a corresponding number of bits in a physical address. The number of bits mapped is a function of the page size associated with the virtual address. For example, for a 4 KB page size, the first 12 bits of the physical address represent offset bits within a page, because 12 bits are sufficient to address every memory location within a 4 KB page. In another example, for a 1 GB page size, the first 30 bits of the physical address represent offset bits within a page, and the remaining 34 bits would be effective address bits.

This disclosure is directed to the particular case where two different operating systems have the same virtual address and real address to refer to the data being accessed by an executing program, but have different process identifiers or context tags in a virtually tagged cache to distinguish the logical address space of process A and process B. When dealing with virtual memory, the operating system will set up translations so that the virtual address of two different processes, e.g., process A and process B, will map to the same real physical address in the machine/system. In practice, the two processes having the same virtual address mapped to the same real address is used for shared libraries of code regions of memory, as well as memory mapped files.

In a virtually tagged cache a dilemma is presented because the virtual address of the two processes are tagged with different address space identifiers or context tags to distinguish the two separate logical address spaces, and are treated as if they have different virtual addresses. More specifically, because the two processes have mismatching context tags, process A and process B are seen as synonyms where two different virtual addresses are mapped to the same real or physical address, and typically in one or more embodiments cannot coexist in the virtually tagged cache and cannot concurrently access the shared data in the virtual cache.

Disclosed are methods and systems to tag the virtual cache with an alias tag in addition to the virtual address and the context tag to indicate those regions of memory where it would be advantageous for two different processes to hit in the virtual cache concurrently if they have the same virtual cache address, same physical address, but a different context tag because that region of memory should be shared by the two processes. Since the shared regions of memory are defined and known in the system, these shared regions are detectable In an aspect, the region of memory to be shared between two processes having the same virtual address, the same physical address, and a different context tag, are assigned an alias tag. In one or more embodiments, when the two different processes, e.g., process A and process B, access the virtual cache for cache lines that are being tracked by this algorithm, although they have different context tags, the algorithm will assign them the same alias tag. An alias tag will allow the two different processes to hit in the virtual cache concurrently if they have the same virtual address, same real address, but a different context tag. The virtual cache directory in one or more embodiments will have an alias tag valid field (ATV) and an alias tag (AT) encoding field added to its tag store, e.g., the virtual cache directory. If the cache line (entry) accessed by process A and process B have the same alias tag X in the tag store (the virtual cache directory), and both process A and process B have access to alias tag X, then both accesses (processes) are allowed to concurrently hit in the virtual cache. Using the alias tag builds a bridge or override that permits the virtual cache hit compare to ignore the different context tags if the two processes have access to the same alias tags.

In one or more embodiments, virtual cache synonym detection is disclosed in and for a processor and/or computer system to enable a plurality of processes to share data in a virtual cache using an alias tag that gets assigned to a memory region in the computer system where different processes have a same virtual address but a different context tag, to avoid cache misses that degrade performance. The multiple processes that have access to the alias tag are permitted to concurrently hit in the virtual memory cache.

Figure 3:
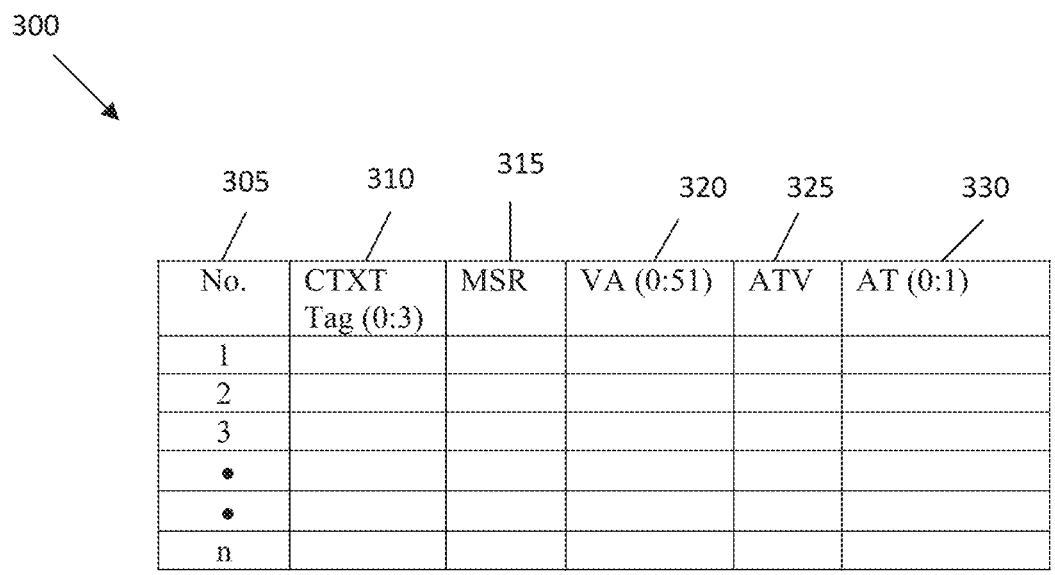
FIG. 3 illustrates an example of portions of a virtual cache directory.

FIG. 3 illustrates a block diagram of a virtual cache directory 300 implementing an embodiment of the alias tag technique, mechanism, and system. Column 305, labeled "No.," represents the entry No or cache line in the virtual cache directory. Column 310, labeled "CTXT Tag (0:3)" is a four bit field for the context tag. The context tag is a compressed identifier of the process, and in one or more embodiments, the compressed identifier of the LPID and/or PID. Virtual cache directory 300 in an embodiment includes column, 315, labeled "MSR," are MSR bits that identify translation address spaces. Column 320, labeled "VA (0:51)," is the virtual address tag, and in this embodiment is virtual address bits (0:51) for a 4K page virtual address. Column 325, labeled "ATV" or alias tag valid, is a bit that qualifies the alias tag as valid for the cache line. ATV when set provides an override opportunity for a miscompare on the context tag. That is, a miscompare on the context tag can be ignored if the ATV bit is set and TID (Threads_AT_Valid) is set in the Alias Table (described below). Column 330, labeled "AT" or Alias Tag, is the pointer into the alias table. The pointer allows threads to hit on alias tags. In one or more embodiments, alias tags are only permitted to be established by threads. The table or block diagram of the virtual cache directory 300 in FIG. 3 does not include all directory bits and is directed to those more relevant to the alias tag mechanism.

The method for detecting the aliases or synonyms is variable by design and includes methods that for a virtual cache miss detect if the miss was due to a synonym since same virtual address, different context tag, same physical address is a variant of different virtual address, same physical address synonyms. The alias tag mechanism also includes an alias table. The alias table tracks the virtual address and real address of cases where a valid synonym is detected, and in an embodiment an alias tag is assigned such that the alias tag indexes the virtual address and real address tracked in the table. The alias table indicates which threads have access to the alias tag.

The alias table tracks the region of memory that the virtual address and real address translation property holds true of the alias condition. In this regard, the translation region size is equal to the page size of the virtual memory translation setup by the operating system. That is, translations of virtual addresses are typically performed on a page granularity. When a synonym exists it also typically exists on the granularity of the system page size. Virtual caches in one or more embodiments are tagged with cache lines that are smaller than the page size. A single page for example typically has many cache lines. For example, a cache line can have 128 bytes and there would be 512 cache lines in a 64K page. Though a single cache line detects the alias property (same VA, different context tag, same RA) in the virtually tagged cache, there are many cache lines in a single page such that if process A was to access the same tracked synonym in this table with a different cache line, this cache line too would be tagged with a valid alias tag in the virtual cache directory. This is known because when the new cache line misses in the virtual cache, the alias table would be searched. If the virtual address and real address match for process A in the valid region of memory, then the alias tag was assigned that process/thread on a previous access to the cache.

Figure 4:
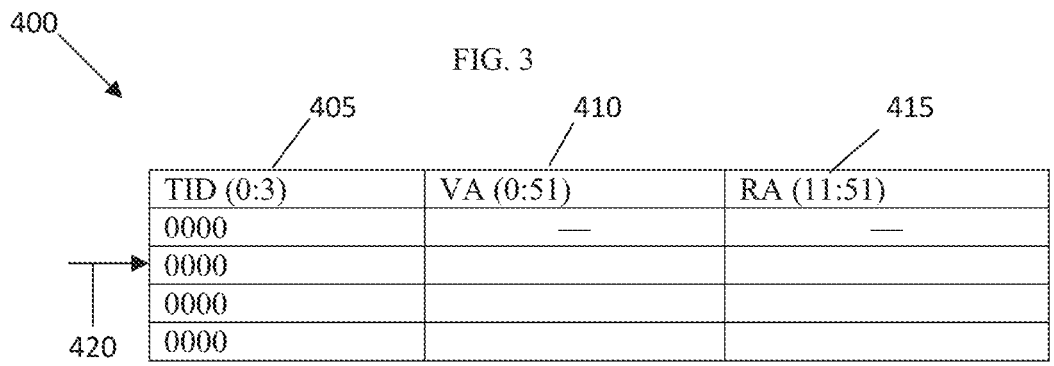
FIG. 4 illustrates an example of an alias table used in conjunction with a virtual cache.

FIG. 4. depicts a block diagram of an illustrative example of an alias table 400 that in one or more embodiments forms part of the alias tracker mechanism. Alias table 400 contains the virtual address (VA), real address (RA), and the TID (Thread ID) of the aliases or synonyms being tracked. Each entry in the table represents a 4K/64K region of memory. Column 405, labeled "TID (0:3)", indicates which threads have access to the alias tag and is a four bit field in this example. Column 410, labeled "VA (0:51)", indicates the virtual address (VA) of the alias tag entry, which is a fifty-two (52) bit field in this example. Column 415, labeled "RA (11:51)", indicates the real address (RA) of the entry in the alias table. The alias table pointer 420 corresponds to the alias (AT) column 330 in the virtual cache directory 300 that identifies the entry No. in the alias table 400. Other columns of data may be present in alias table 400, such as, for example, a bit field to indicate whether a region is writeable.

The virtual cache synonym detection method, mechanism, and system to enable a plurality of operating system processes to share data in a virtual memory cache using an alias tag which gets assigned to a region of memory in the computer system where different processes have the same virtual and real address but a different context tag will be described by reference to FIGS. 5-10, which show the virtual cache directory 300, the real address directory 500, and an alias table 400. In FIGS. 5-10 a method of enabling and using an alias table and virtual cache are described where an alias tag is used to override a context tag and permit a virtual cache to concurrently hit on a virtual cache access demand to two different processes, e.g., threads, having the same virtual address, different context tag, and same real address.

Figure 5:
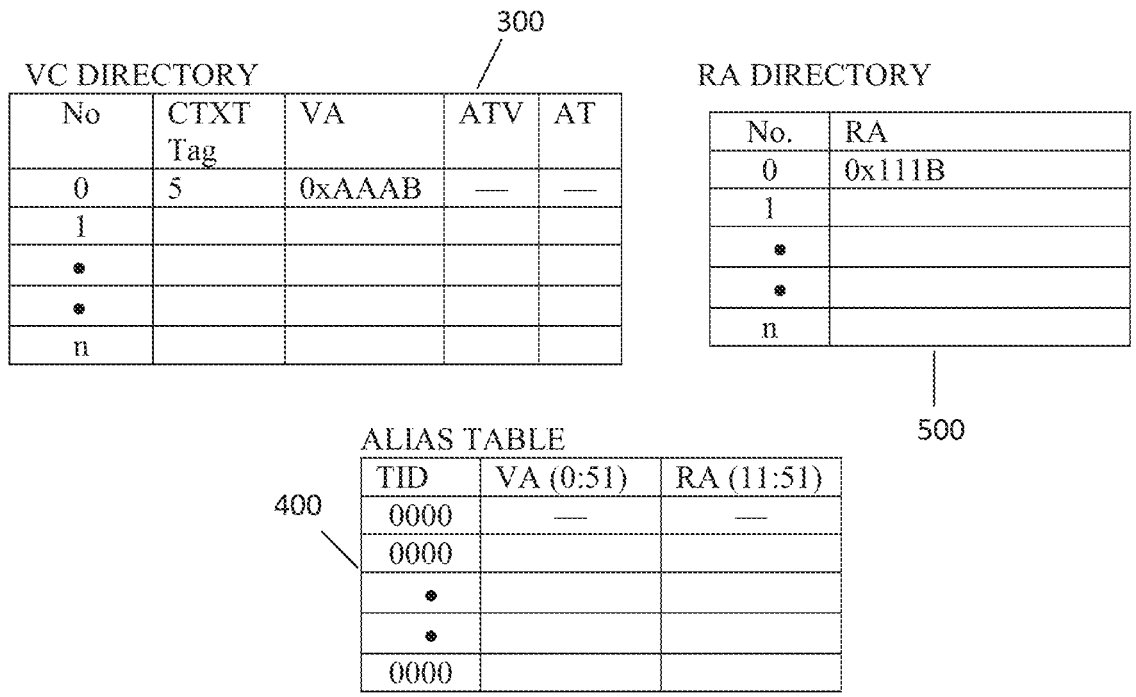
FIGS. 5, 6, 7, 8, 9 and 10 illustrates an example of a virtual cache synonym detection and tracking mechanism, system, and method as it processes data access demands through a series of operations by a virtual cache directory, physical memory directory, and an alias table.

FIGS. 5-10 show and describe an example or embodiment of how the virtual cache synonym detection and alias tag tracking works in a processor. The example in FIGS. 5-10 shows various data access demands made to a virtual cache having a virtual cache directory 300, where thread 0 has access to context tag 5, and thread 2 has access to context tag 6. In the state shown in FIG. 5, the virtual cache, as illustrated by the virtual cache (VC) directory 300, has a cache line in Entry 0 with virtual address VA=0xAAAB. Since the virtual address in the virtual cache is for thread 0, context tag 5 (CTXT Tag=5) is marked in entry 0 in the virtual cache directory 300 as shown in FIG. 5. The Alias Tag Valid bit (ATV) is not activated at this stage as no synonyms or aliases have been detected, and no Alias Tag (AT) (alias table entry No.) is identified. Physical memory has real address 0x111B that corresponds to VA=0xAAAB stored in entry 0 in the real address (RA) directory 500 in FIG. 5. In an embodiment, the virtual address directory and the read address directory are set associative. No aliases or synonyms have been detected or entered into the alias table 400 at this stage so the alias table has not been setup, enabled, or primed with aliases/synonyms at this point as shown in FIG. 5. The alias table 400 is empty and aliases/synonyms need to be detected to populate the alias table 400 with data.

Figure 6:
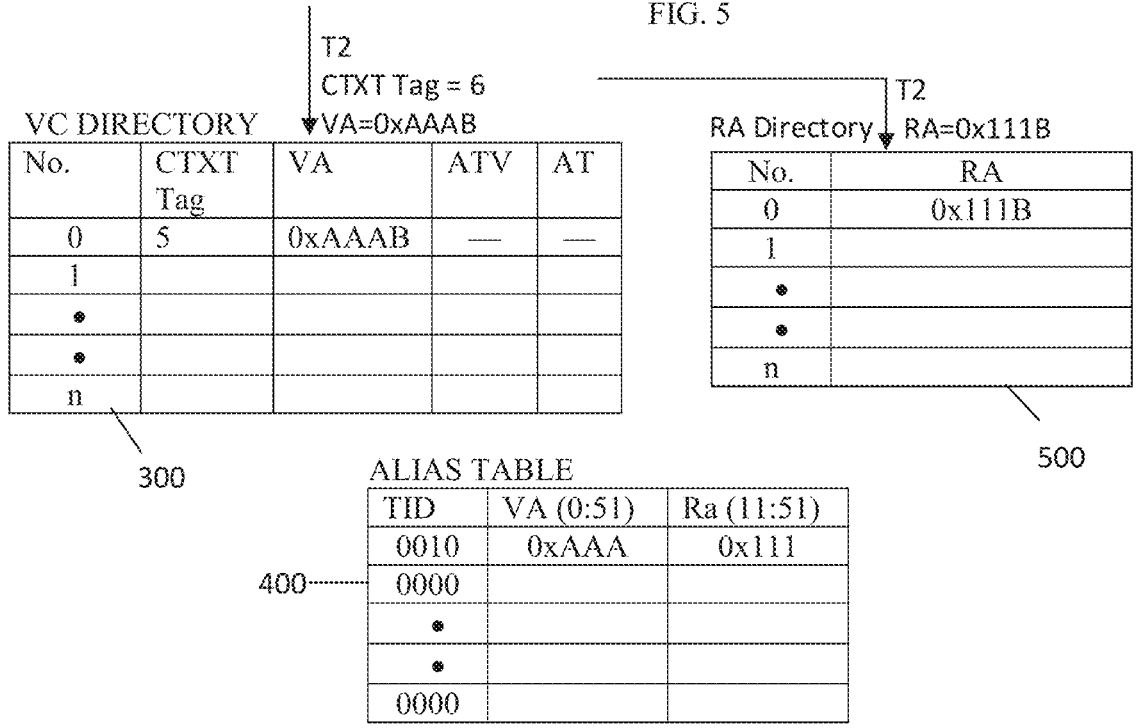

In the example, as shown in FIG. 6, thread 2 (context tag 6) accesses the virtual cache with access demand for VA=0xAAAB. Virtual cache as shown by virtual cache directory 300 has VA=0xAAAB, and context tag 5, so the access demand is compared to all entries in the virtual cache including entry 0. The virtual address (VA) of the access demand matches the virtual address in entry 0 of the virtual cache directory 300, but the access demand does not match the context tag in Entry 0 and there is a virtual cache miss. In resolving the virtual cache miss, the access demand is sent to memory as shown in FIG. 6 where it is translated into RA=0x111B and hits (matches) in the RA directory 500 (matches entry No. 0). As there is nothing valid in the alias table 400 (FIG. 5), e.g., there are no aliases or synonyms in the alias table 400, the alias table 400 misses. However, the RA table hit indicates a synonym and a new alias tag is installed in the alias table 400, as shown in FIG. 6. The alias table 400 has VA=0xAAA and RA=0x111 installed in entry 0. In addition, the thread identification, TID, is updated in the alias table 400 to identify thread 2 as having access to the alias tag in entry 0. In this embodiment, the synonym detection is performed through the RA directory, but other means, systems, and mechanisms for detecting synonyms are contemplated.

Figure 7:
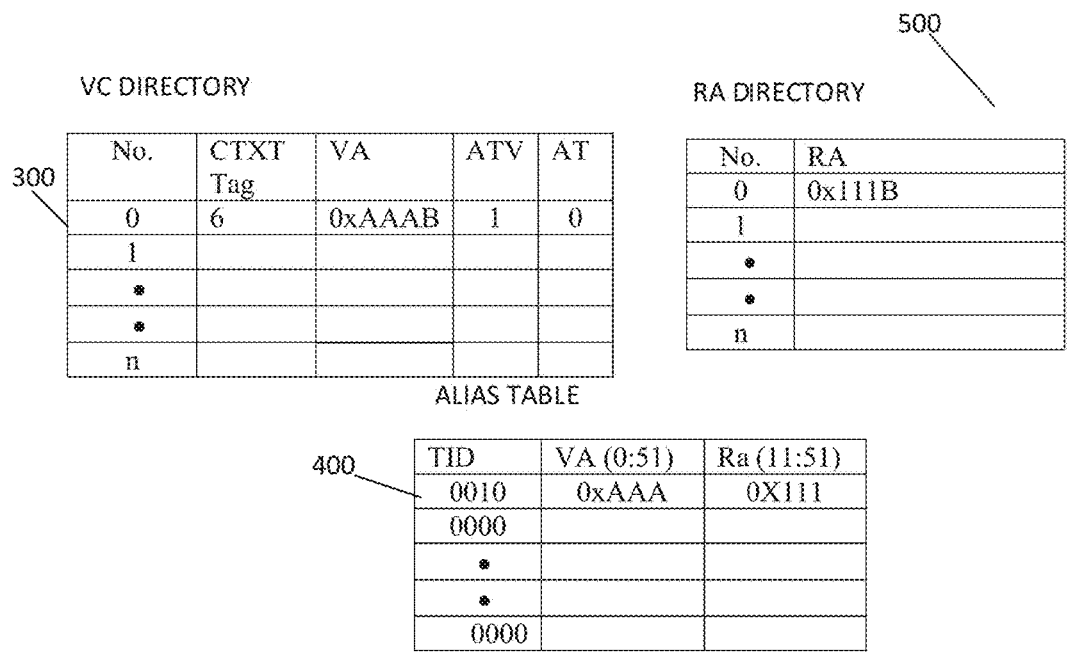

As indicated earlier, in one or more embodiments, the same real (physical) address can exist in only one location (entry) in a virtual cache and accordingly the virtual cache directory 300 is updated and entry 0 is renamed as shown in FIG. 7. More specifically, the context tag is changed to context tag 6 corresponding to the thread 2 access demand that missed in the virtual cache. In addition, as shown in FIG. 7, the alias tag (AT) is updated in the virtual cache directory 300 to refer to entry 0 (AT=0), and the Alias Tag valid (ATV) bit is activated (tagged) in the virtual cache directory.

Figure 8:
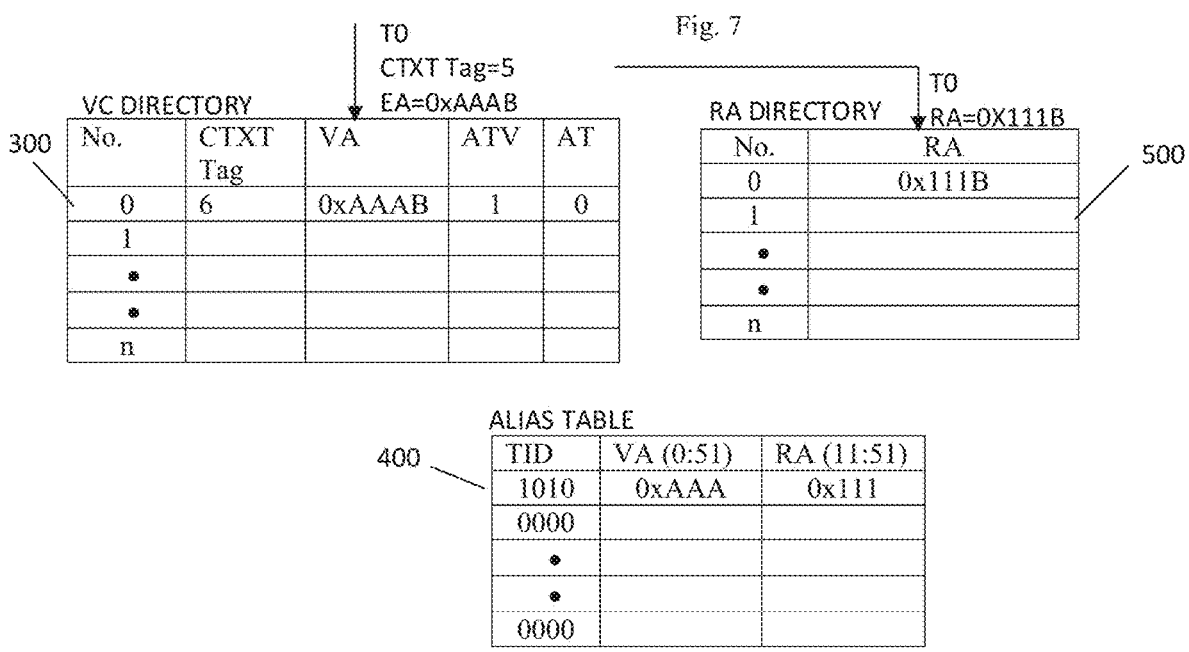
Figure 9:
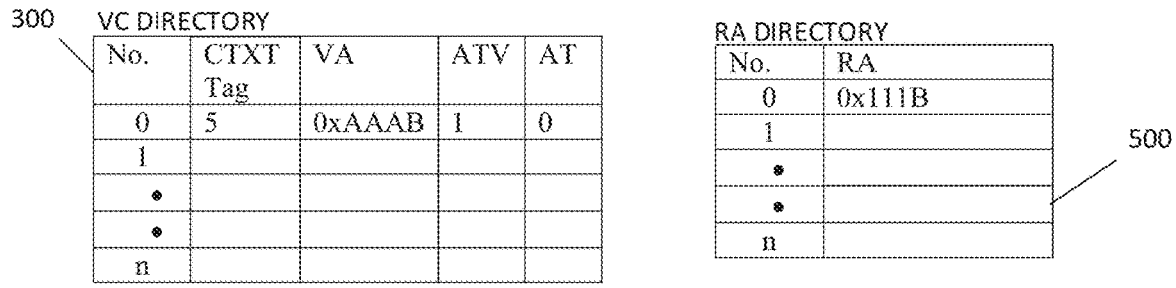
Figure 9:
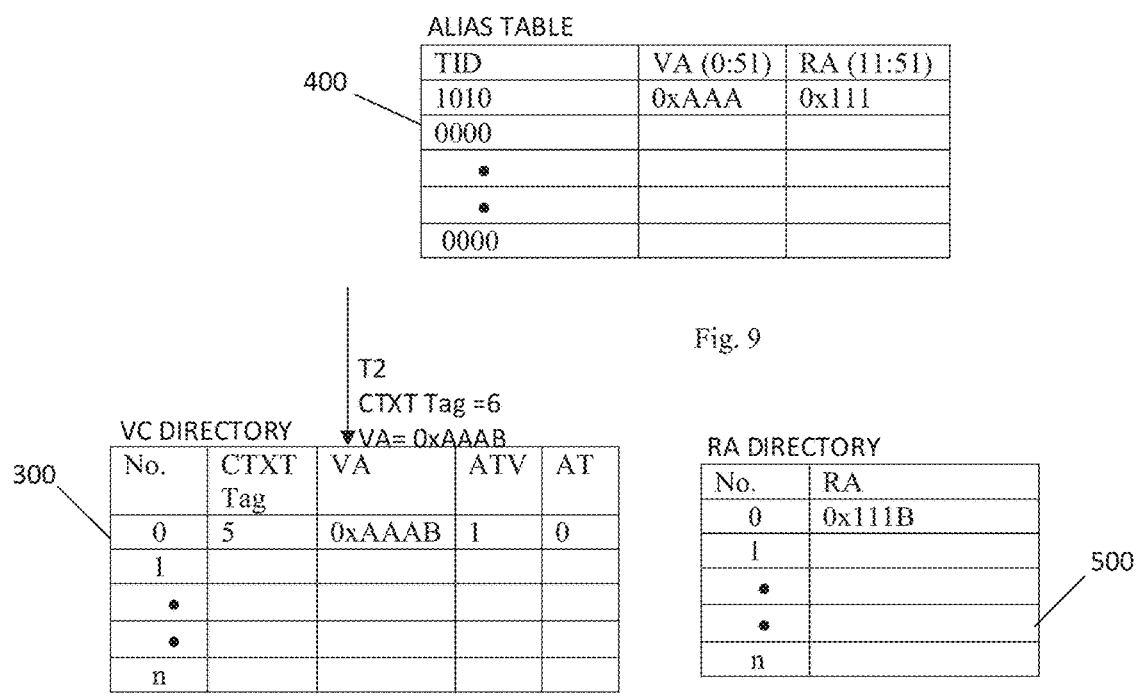

A new access demand is made to the virtual cache from thread 0 with context tag 5 (CTXT Tag=5) and virtual address 0XAAAB as shown in FIG. 8. The new access demand misses in the virtual cache because the previous thread 2 access demand changed the context tag to 6 (CTXT tag=6) in entry 0 as shown in FIG. 7, and so the context tag in the virtual cache for the matching VA (entry 0 in virtual cache directory) does not match the context tag of the current data access demand. The thread 0 (T0) access demand is sent to memory, translates and hits in the real address (RA) directory 500 and hits in the alias table 400 (EA and RA match), and thread 0 (T0) is added to the alias table entry 0 where the VA and RA hit as shown in FIG. 8. The virtual cache entry 0 is renamed again, i.e., the context tag is updated to refer to thread 0 (CTXT Tag=5), and the alias tag stays valid as shown in the virtual cache directory 300 shown in FIG. 9.

Figure 10:
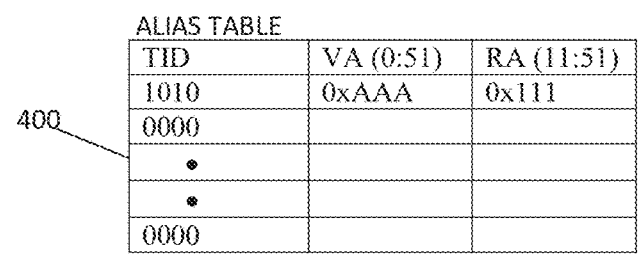

Thread 2 (T2) accesses the virtual cache with an access demand yet again with its context tag, i.e. context tag 6 (CTXT=6), and virtual address VA=0xAAAB as shown in FIG. 10. This time the access demand hits in the virtual cache because although there is a mismatch with the thread 2 access demand (CTXT Tag=6) with the context tag 5 in the virtual cache directory 300, the alias tag valid bit is active which directs logic to entry 0 (AT=0) in the alias table 400. Alias table entry 0 shows that thread 2 (T2) has access to the alias tag so the thread 2 (T2) access demand hits in the virtual cache. The alias tag being active for thread 2 has the virtual cache ignore the context tag and hit with the thread 2 data access demand. If the thread does not have access to the alias tag, then the access demand to the virtual cache will not hit in the virtual cache. For example, if the next access to the virtual cache is for thread 3 (T3) having context tag 20 (CTXT tag=20) and VA=0xAAAB, such an access demand will miss in the virtual cache because although the ATV bit in entry 0 in the virtual cache directory 300 is active, the AT entry in the virtual cache directory directs logic to the alias table 400 entry 0, and the alias table 400 does not indicate that thread 3 has access to the alias tag.

The virtual cache will hit or miss depending upon whether the access demand matches the data, e.g., the virtual address field, in the virtual cache directory 300, and whether the ATV bit is active and/or the thread has access to the alias tag. Table 1 below indicates whether or not there is a virtual cache hit or miss depending upon whether there is a virtual address (VA) match, a context tag (CTXT Tag) match, whether the alias tag valid (ATV) bit is activated, and whether the thread has access to the alias tag.

TABLE 1

| VA Match | CTXT TAG Match | Alias Tag Valid | Thread Access to Alias Tag | Action Hit/Miss |
|---|---|---|---|---|
| Yes | No | No | — | Miss |
| Yes | Yes | — | — | Hit |
| Yes | No | Yes | No | Miss |
| Yes | No | Yes | Yes | Hit |
| No | — | — | — | Miss |

During operation of the method and system of enabling virtual caches to share data using the alias table 400, various actions will be undertaken depending upon whether an access demand triggers a hit or miss in the alias table and/or the real address directory. Table 2 below identifies the various actions that are undertaken after a virtual cache miss depending upon whether there is an alias table 400 hit or miss, and a RA directory 500 hit or miss.

TABLE 2

| Alias Table | RA Directory | Action |
| --- | --- | --- |
| Miss | Miss | Pick victim to replace in virtual cache |
| Miss | Hit | Overwrite VA Directory |
| | | Install Entry in Alias Table |
| | | Invalidate old tag in virtual cache |
| Hit | | Overwrite VA Directory |
| (VA & RA Match) | | Add thread to entry in Alias Table Access Control List |

Different aliases index into different entries in alias table 400. There are a finite number of entries in the alias table 400 and when the number of regions of memory that are being tracked exceeds the size of the alias table, a pre-existing alias tag entry will need to be evicted. If the alias table is full and a virtual cache miss finds a new synonym that doesn't have a matching virtual address (VA) and real address (RA) in the table, then a victim (entry in the alias table) to evict from the alias table is selected. The victim (entry) to evict from the alias table can be selected using different criteria and/or methods. In an embodiment, a least recently used (LRU) method (algorithm) can be used to select the victim to evict from the alias table 400.

When a victim to remove from the alias table 400 is selected, the virtual cache directory 300 is searched for all cache lines (entries) tagged with a valid alias tag matching the evicted entry in the alias table 400. For example, if entry No. 1 is to be evicted from the alias table, the virtual cache directory is searched for AT=1 where the alias tag valid (ATV) bit is set. When the search finds a matching alias tag (AT) in the virtual cache directory 300, the alias tag valid (ATV) field is set to invalid, and all processes are revoked from having access to the alias tag that was selected for eviction from the alias table 400. The new synonym or alias is installed into the virtual cache for the new region of memory being tracked, and the access permissions are set according to the process (thread) of the new synonym access demand.

Figure 11A:
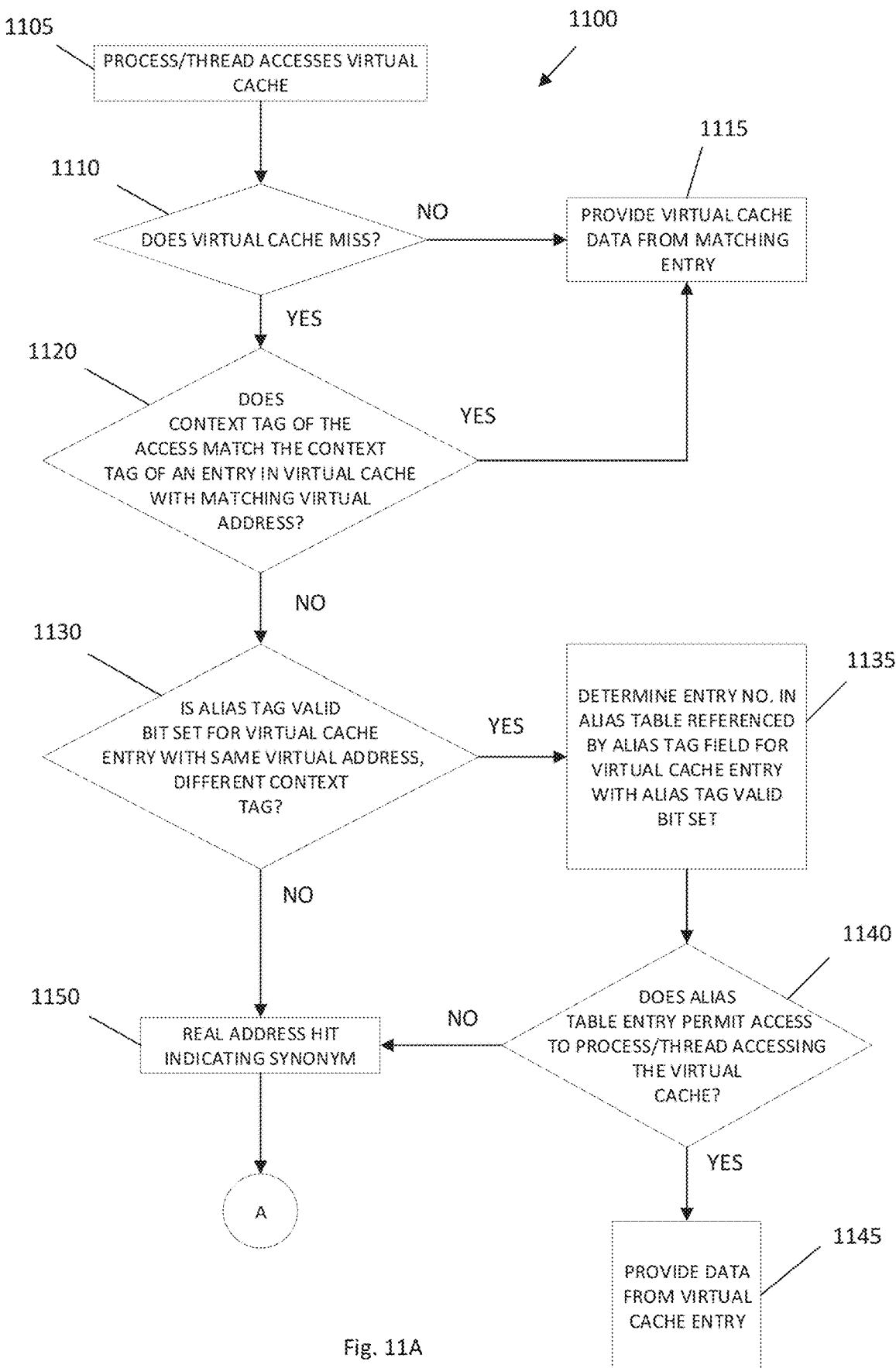
FIGS. 11A and 11B are an exemplary flowchart illustrating and describing a method of handling data access demands including synonyms in a virtual cache of an information handling and/or data processing system.
Figure 11B:
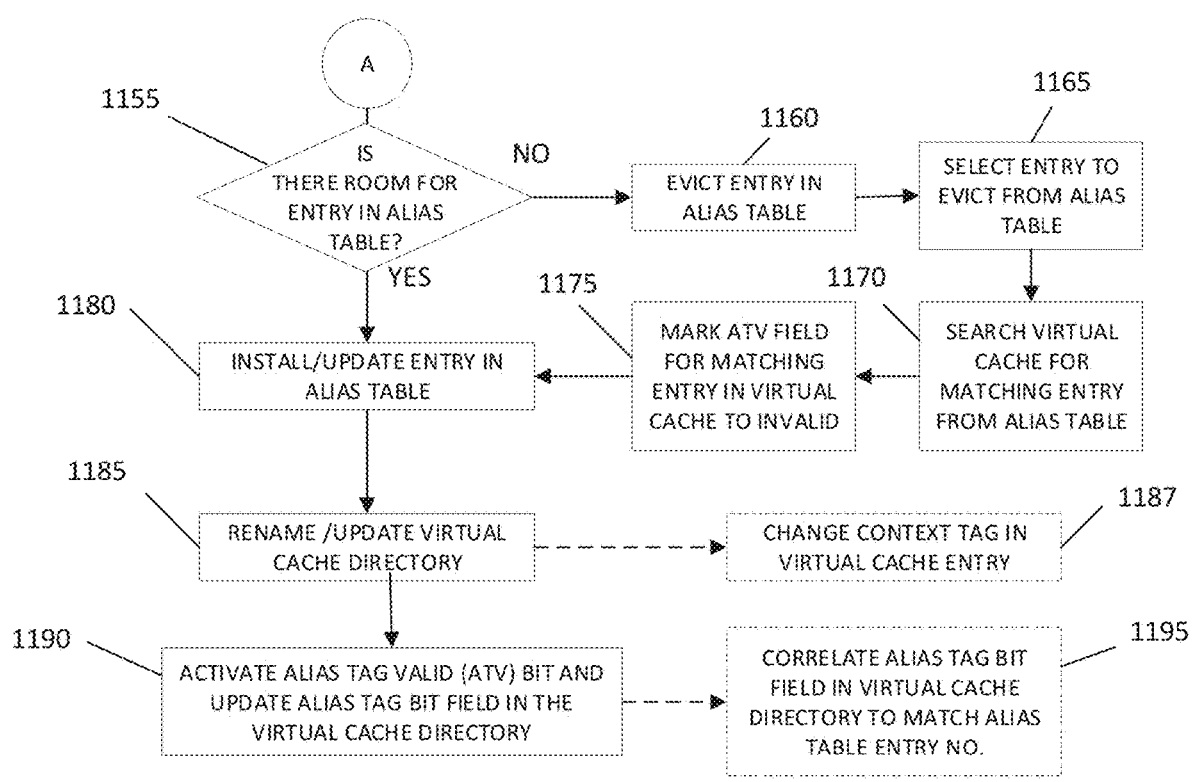

FIG. 11 is an exemplary flowchart in accordance with one or more embodiments illustrating and describing a method of handling accesses to a virtual cache, including handling synonyms in virtual caches, more specifically an example of a method of permitting multiple synonyms in a virtual cache with the same virtual address but a different context tag to share data in a virtual cache, e.g., multiple processes or threads both have access to data in the virtual cache. While the method 1100 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 11, but the process may be integrated and/or one or more steps may be performed together, simultaneously, or the steps may be performed in the order disclosed or in an alternate order.

In one or more embodiments, method 1100, includes preparing, priming, and/or enabling an alias table so that synonyms with different context tags but access to an alias tag can override the different context tags, hit in the virtual cache, and have access to data in the virtual cache. Method 1100 also includes using the alias table mechanism to permit more than one process or thread to access data in a virtual cache.

At 1105, a process or thread, in this example a first process or thread, accesses the virtual cache. The virtual cache, may or may not have any entries, and to the extent there are no entries, or the virtual cache is not full, the virtual cache will allocate and store entries in the normal course. At 1110, upon a data access demand to the virtual cache it will be determined whether there is a hit or miss in the virtual cache.

If there is a cache hit (1110: No), e.g., a virtual address and context tag match, then at 1115 the data referenced by the data access demand is provided. That is, the data in the virtual cache entry with the matching virtual address and context tag is provided (read). If there is a virtual cache miss (1110: Yes), then at 1120 it is determined if the virtual cache miss was because of a difference or miscomparison between the context tag of the data access demand and the context tag of an entry in the virtual cache that has the same virtual address as the virtual address of the data access demand. One manner of making this determination is to determine if the virtual address of the data access demand matches the virtual address of any of the entries in the virtual cache, and if so, determine whether any of those matching virtual address entries have a matching context tag. If none of the virtual addresses in the virtual cache match the virtual address of the access demand, then an entry of the virtual cache is updated, replaced, or loaded (deallocated and allocated) with new data and the virtual cache directory is updated. If the virtual address and the context tag of the data access demand matches (is the same as) any entry in the virtual cache (1120: Yes), then the process 1100 proceeds to 1115 since such a scenario would constitute a virtual cache hit and the data in the virtual cache would be accessible and provided.

If on the other hand, the virtual address of the data access demand matches the virtual address of one of the entries in the virtual cache, but the context tag of data access demand does not match the context tag of the virtual cache entry with the matching virtual address (1120: No), then the process 1100 continues to 1130. At 1130 it is determined whether the entry in the virtual cache with the same virtual address but a different context tag has its alias tag valid bit set or active. If it is determined that the alias tag valid bit is set or active in the entry of the virtual cache with the same virtual address, but a different context tag than the data access demand (1130: Yes), then at 1135 the entry No. in the alias table referenced or identified by the alias tag field in the virtual cache entry where the alias tag valid bit is set or active is determined. The process continues at 1140, where the alias table is checked to determine whether the thread or process accessing the virtual cache has permission to access to the alias tag identified in the virtual cache directory. More specifically, at 1140 it is determined whether the alias table entry referred to by the virtual cache entry, e.g., by the alias tag bit field in the virtual cache, provides the process or thread of the data access demand permission to access that entry of the virtual cache. That is, if the alias tag valid is active in the virtual cache entry, then an alias or synonym has previously been identified and the alias table is at least partially set up with data from a synonym. If the alias table has been at least partially set up and a synonym has been previously identified for the virtual address that is the subject of the virtual cache data access demand, the method 1100 checks whether the currently executing data access demand, and in particular the process or thread making the access, has access to the alias tag identified in virtual cache directory by checking the alias table entry referred to by the alias tag.

If the process or thread accessing the virtual cache has permission, e.g., is permitted, to access the alias or synonym (1140: Yes), then at 1145 the data from the virtual cache entry which meets the criteria (matching VA, different context tag) is provided. If on the other hand, the thread or process of the data access demand does not have permission to access the virtual cache entry as determined by the alias tag in the virtual cache entry (1140: No), then the process moves to 1150. If the entry in the virtual cache with the matching (same) virtual address but a different context tag does not have its alias tag valid bit marked (1130: No), then no synonym has been identified and the alias table has not been populated with data relevant for this virtual cache access demand, and the process continues to 1150.

At 1150 it is determined whether there is a physical memory, e.g., real address directory, hit indicting a synonym for the virtual address of the data access demand made to the virtual cache. In an embodiment, synonyms are detected through the real address directory, however, other mechanisms, means, and/or systems are contemplated for detecting synonyms that will perform in the disclosed system and method. If a synonym is detected, then the process 1100 continues to 1155 where it is determined whether there is room in the alias table to enter data on an alias. If there is no room to enter data on an alias in the alias table (1155: No), then the process continues to 1160 where an entry in the alias table is evicted to make room for new entry in the alias table. In an embodiment, evicting an entry from the alias table includes at 1165 selecting or choosing an entry to evict from the alias table. The entry to evict from the alias table can be selected by any number of prioritizing criteria including using a least recently used algorithm to select the entry to evict (remove) from the alias table. In response to the victim (entry) in the alias table to remove being selected, the virtual cache directory at 1170 is searched for all cache lines (entries) tagged with alias tag (AT) that matches the evicted entry in the alias table. At 1175 the ATV field in the virtual cache corresponding to the entry to be evicted from the alias table is marked invalid or deactivated. When the ATV field is marked invalid all processes are revoked from having access to the alias tag that was selected for eviction from the alias table.

The process 1100 after 1175 continues to 1180 where the alias is installed in the evicted entry in the alias table. Similarly, if there is determined to be room in the alias table at 1155, then the process continues to 1180 where the alias is installed or updated in an entry in the alias table. At 1180, the data on the synonym is added to an entry in the alias table, or in situations where the synonym already exists in an alias table entry, the thread identification (TID) in the tagged entry in the alias table is updated. More specifically, the virtual address and corresponding real address would be added to an entry in the alias table if the synonym was not previously detected, and/or did not previously exist in the alias table. The thread/process identification (TID) or context tag information would also be added or updated in the corresponding entry in the alias table. The thread identification (TID) information being added to, and/or updated in, the alias table would be the thread or process that was executing the data access demand.

The process 1100 would continue at 1185 where the entry in the virtual cache directory would be renamed and updated with the data access demand information. In one or more embodiments, updating the virtual cache directory 300 would include at 1187 changing the context tag in the corresponding entry of the virtual cache directory 300 to be the context tag of the data access demand. The process continues to 1190 where the Alias Tag Valid (ATV) bit in the virtual cache directory is activated or set and, if appropriate, the alias tag bit field in the virtual cache directory corresponding to the entry in alias table is entered and/or updated. For example, in one or more embodiments, the alias tag bit field in the virtual cache directory is entered/activated to match and/or correlate to the alias table entry having or containing the synonym data at 1195.

In one or more embodiments, when the algorithm for identifying synonyms indicates a synonym related cache miss on an access to a page because of a different context tag, a state machine will be allocated to find synonyms (aliases) within the page, and will enter or update an alias table and update the virtual cache directory with alias information. The advantage of the method and system is that it increases processor performance by permitting multiple processes or threads to hit concurrently in a virtual cache if they have the same virtual address, same physical address, but different context tags.

While the illustrative embodiments described above are preferably implemented in hardware, such as in units and circuitry of a processor, various aspects of the illustrative embodiments and/or techniques may be implemented in software as well. For example, it will be understood that each block of the flowchart illustrations in FIGS. 11A and 11B, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A non-transitory data storage medium comprising programming instructions that when executed by a processor cause the processor to:
    make a data access demand to a virtual cache having a plurality of entries;
    determine, in response to making a data access demand to the virtual cache, whether the data access demand misses in the virtual cache;
    determine, in response to the data access demand missing in the virtual cache, if the virtual cache data access demand missed because of a difference in a context tag of the data access demand and a context tag of a corresponding entry in the virtual cache with the same virtual address as the data access demand;
    determine, in response to the virtual cache missing because of a difference in the context tag of the data access demand and the corresponding entry in the virtual cache, whether an alias tag valid bit is set in the corresponding entry of the virtual cache;
    determine, in response to the alias tag valid bit not being set for the corresponding entry in the virtual cache with the matching virtual address of the data access demand but a different context tag, whether the virtual cache data access demand hits in physical memory with the translated real address and is a synonym of the corresponding entry in the virtual cache; and
    update, in response to the virtual access demand being a synonym of the corresponding entry in the virtual cache with the same virtual address but a different context tag, information in a tagged entry in an alias table referenced by the corresponding entry in the virtual cache.

2. The non-transitory data storage medium according to claim 1, wherein updating information in the tagged entry in the alias table further includes programming instructions that when executed by the processor cause the processor to add to the alias table the virtual address of the virtual cache access demand and the translated real address of the synonym.

3. The non-transitory data storage medium according to claim 2, further comprising programming instructions that when executed by the processor cause the processor to add a thread identification to the tagged entry in the alias table, wherein the thread identification identifies the thread making the virtual cache access demand.

4. The non-transitory data storage medium according to claim 1, further comprising programming instructions that when executed by the processor cause the processor to determine, in response to the alias tag valid bit being set for the corresponding entry in the virtual cache with the matching virtual address of the access demand but a different context tag, if the thread making the data access demand to the virtual cache has permission to access the corresponding entry in the virtual cache.

5. The non-transitory data storage medium according to claim 4, further comprising programming instructions that when executed by the processor cause the processor to check the tagged entry in the alias table referenced by an alias tag bit field in the corresponding entry in the virtual cache to determine if the thread making the data access demand to the virtual cache has permission to access that corresponding entry in the virtual cache.

6. The non-transitory data storage medium according to claim 4, further comprising programming instructions that when executed by the processor cause the processor to provide, in response to the thread of the data access demand having permission to access the corresponding entry in the virtual cache, the data in that corresponding entry in the virtual cache.

7. The non-transitory data storage medium according to claim 4, further comprising programming instructions that when executed by the processor cause the processor to:
    determine, in response to the thread of the access demand not having permission to access the corresponding entry in the virtual cache, whether the virtual cache data access demand hits in physical memory with the translated real address and is a synonym of the corresponding entry in the virtual cache; and
    update, in response to the virtual access demand being a synonym of the corresponding entry in the virtual cache with the same virtual address but a different context tag, the tagged entry in the alias table to grant permission to the thread of the data access demand.

8. The non-transitory data storage medium according to claim 4, further comprising programming instructions that when executed by the processor cause the processor to, update, in response to the thread of the access demand not having permission to access the corresponding entry in the virtual cache, the tagged entry in the alias table to grant permission to the thread of the data access demand.

9. The non-transitory data storage medium according to claim 4, further comprising programming instructions that when executed by the processor cause the processor to:

set, in response to the thread of the data access demand not having permission to access the corresponding entry in the virtual cache, the alias tag valid bit in the corresponding entry in the virtual cache if not already set valid, and update the alias tag bit field in the corresponding entry in the virtual cache to reference the tagged entry in the alias table if not already set.

10. The non-transitory data storage medium according to claim 9, wherein updating the alias tag bit field in the corresponding entry in the virtual cache further comprises programming instructions that when executed by the processor cause the processor to include setting the alias tag bit field in the corresponding entry in the virtual cache to match the tagged entry in the alias table.

11. The non-transitory data storage medium according to claim 1, further comprising programming instructions that when executed by the processor cause the processor to update, in response to a virtual cache miss because of a synonym in the virtual cache, at least one of the virtual cache entries.

12. The non-transitory data storage medium according to claim 11, wherein updating one or more entries in the virtual cache because of a synonym comprises programming instructions that when executed by the processor cause the processor to change the context tag of the corresponding entry in the virtual cache.

13. The non-transitory data storage medium according to claim 1, further comprising programming instructions that when executed by the processor cause the processor to provide, in response to the virtual cache data access demand matching the virtual address and context tag in a virtual cache entry, the data in that matching virtual cache entry.

14. The non-transitory data storage medium according to claim 1, further comprising programming instructions that when executed by the processor cause the processor to:
determine whether there is room for an entry in the alias table, and
in response to determining that there is no room in the alias table, evict an entry in the alias table and deactivate the alias tag valid bit field for the corresponding entry in the virtual cache.

15. A computing system comprising:
a virtual cache having a plurality of entries having a virtual address and associated data, each entry in virtual cache having a bit field for the virtual address, a context tag, an alias tag valid, and an alias tag;
an alias table for tracking the virtual address and translated real address of synonyms; and
wherein the virtual cache is configured to:
receive a data access demand to the virtual cache, and in response to the virtual cache receiving a data access demand to the virtual cache, the system is configured to:
determine whether the data access demand misses in the virtual cache;
determine, in response to the data access demand missing in the virtual cache, if the virtual cache data access demand missed because of a difference in the context tag of the data access demand and the context tag of a corresponding entry in the virtual cache with the same virtual address as the data access demand;
determine, in response to the virtual cache missing because of a difference in the context tag of the data access demand and the corresponding entry in the virtual cache, whether the alias tag valid bit is set in the corresponding entry of the virtual cache;

determine, in response to the alias tag valid bit being set for the corresponding entry in the virtual cache with the matching virtual address of the access demand but a different context tag, if the thread making the data access demand to the virtual cache has permission to access the corresponding entry in the virtual cache: and
provide, in response to the thread of the data access demand having permission to access the corresponding entry in the virtual cache, the data in that corresponding entry in the virtual cache.

16. The system of claim 15, wherein the system is further configured to:
determine, in response to the alias tag valid bit not being set for the corresponding entry in the virtual cache with the matching virtual address of the data access demand but a different context tag, whether the virtual cache data access demand hits in physical memory with the translated real address and is a synonym of the corresponding entry in the virtual cache; and
update, in response to the virtual access demand being a synonym of the corresponding entry in the virtual cache with the same virtual address but a different context tag, information in a tagged entry in the alias table referenced by the corresponding entry in the virtual cache.

17. The system of claim 15, the system is further configured to check the tagged entry in the alias table referenced by an alias tag bit field in the corresponding entry in the virtual cache to determine if the thread making the data access demand to the virtual cache has permission to access that corresponding entry in the virtual cache.

18. The system of claim 15, wherein the system is further configured to:
in response to the thread of the access demand not having permission to access the corresponding entry in the virtual cache, determine whether the virtual cache data access demand hits in physical memory with the translated real address and is a synonym of the corresponding entry in the virtual cache; and
in response to the virtual access demand being a synonym of the corresponding entry in the virtual cache with the same virtual address but a different context tag, update the tagged entry in the alias table to grant permission to the thread of the data access demand.

19. The system of claim 15, wherein the system is further configured to, in response to the thread of the access demand not having permission to access the corresponding entry in the virtual cache:
update the tagged entry in the alias table to grant permission to the thread of the data access demand; and
set the alias tag valid bit in the corresponding entry in the virtual cache if not already set valid; and
update the alias tag bit field in the corresponding entry in the virtual cache to reference the tagged entry in the alias table if not already set.

20. A computing system comprising:
a virtual cache having a plurality of entries having a virtual address and associated data, wherein each entry has a bit field for a context tag, the virtual address, an alias tag valid, and an alias tag;
a physical memory having a plurality of entries for storing data;
an alias table for tracking the virtual address and translated real address of synonyms, the alias table having a plurality of entries, each entry including the virtual address and mapped real address of a synonym, and a tread identification;
a processor; and a non-transitory computer-readable storage medium comprising program instructions that when executed by the processor cause the processor to:

make a data access demand to the virtual cache;

determining, in response to making a data access demand to the virtual cache, whether the data access demand misses in the virtual cache;

in response to the data access demand missing in the virtual cache, determine if the virtual cache data access demand missed because of a difference in the context tag of the data access demand and the context tag of a corresponding entry in the virtual cache with the same virtual address as the data access demand;

determine, in response to the virtual cache missing because of a difference in the context tag of the data access demand and the corresponding entry in the virtual cache, if the alias tag valid bit is set in the corresponding entry of the virtual cache;

determine, in response to the alias tag valid bit being set for the corresponding entry in the virtual cache with the matching virtual address of the access demand but a different context tag, if the thread making the data access demand to the virtual cache has permission to access the corresponding entry in the virtual cache; and provide, in response to the thread of the data access demand having permission to access the corresponding entry in the virtual cache, the data in that corresponding entry in the virtual cache.

* * * * *